United States Patent
Curtis

(10) Patent No.: US 7,290,069 B2
(45) Date of Patent: Oct. 30, 2007

(54) DATA ACQUISITION SYSTEM WHICH MONITORS PROGRESS OF DATA STORAGE

(75) Inventor: Matthew C. Curtis, Leander, TX (US)

(73) Assignee: National Instruments Corporation, Austin, TX (US)

(*) Notice: Subject to any disclaimer, the term of this patent is extended or adjusted under 35 U.S.C. 154(b) by 514 days.

(21) Appl. No.: 10/911,105

(22) Filed: Aug. 4, 2004

(65) Prior Publication Data

US 2005/0235073 A1 Oct. 20, 2005

Related U.S. Application Data

(60) Provisional application No. 60/562,714, filed on Apr. 16, 2004.

(51) Int. Cl.
*G06F 13/28* (2006.01)
*G06F 13/00* (2006.01)

(52) U.S. Cl. ............ 710/22; 710/34; 710/56; 710/308; 711/147

(58) Field of Classification Search ............ 710/22–28, 710/33–35, 48–57, 308–310; 711/1–4, 147–153
See application file for complete search history.

(56) References Cited

U.S. PATENT DOCUMENTS

| | | | |
|---|---|---|---|
| 5,247,626 A | | 9/1993 | Firoozmand |
| 5,404,357 A | * | 4/1995 | Ito et al. ............ 714/719 |
| 5,548,587 A | | 8/1996 | Bailey et al. |
| 5,659,479 A | | 8/1997 | Duley et al. |
| 5,694,333 A | | 12/1997 | Andrade et al. |
| 6,012,109 A | * | 1/2000 | Schultz .................. 710/56 |
| 6,023,744 A | * | 2/2000 | Shoroff et al. ............ 711/4 |
| 6,084,880 A | | 7/2000 | Bailey et al. |
| 6,134,607 A | * | 10/2000 | Frink ..................... 710/22 |
| 6,412,028 B1 | | 6/2002 | Steed et al. |
| 6,470,071 B1 | | 10/2002 | Baertsch et al. |
| 6,636,215 B1 | | 10/2003 | Greene |
| 7,069,350 B2 | * | 6/2006 | Fujita et al. ............ 710/22 |

OTHER PUBLICATIONS

National Instruments Corporation, Measurement and Automation Catalog 2002, p. 244.
National Instruments Corporation, Measurement and Automation Catalog 2003, pp. 180-251 and 376-391.

\* cited by examiner

*Primary Examiner*—Christopher Shin
(74) *Attorney, Agent, or Firm*—Meyertons Hood Kivlin Kowert & Goetzel, P.C.; Jeffrey C. Hood; Russell E. Henrichs

(57) ABSTRACT

A pattern may be written to an allocated section of host memory to track how much data has been received in the host memory from a direct memory access controller coupled to a First In, First Out memory. A driver may send the most recently written sample of data from the host memory to an application requesting sampled data. The driver may determine the amount of data written to the host memory by reading the allocated section of host memory and determining the size of a portion of memory, that previously had the pattern, that has been written over with data. The driver may determine if more data than a predetermined amount of data has been written to the host memory or is available to be written to the host memory, and if necessary, send an indication to the application.

52 Claims, 11 Drawing Sheets

DATA ACQUISITION SYSTEM WHICH MONITORS PROGRESS OF DATA STORAGE

PRIORITY INFORMATION

This application claims benefit of priority of U.S. provisional application Ser. No. 60/562,714 titled "Monitoring Progress of Direct Memory Access" filed Apr. 16, 2004, whose inventor is Matthew C. Curtis.

BACKGROUND OF THE INVENTION

1. Field of the Invention

This invention relates generally to computer systems and, more particularly, to memory access for computer systems.

2. Description of the Related Art

Scientists and engineers often use measurement or instrumentation systems to perform a variety of functions, including laboratory research, process monitoring and control, data logging, analytical chemistry, test and analysis of physical phenomena, and control of mechanical or electrical machinery, to name a few examples. An instrumentation system typically includes transducers and other detecting means for providing "field" electrical signals representing a process, physical phenomena, equipment being monitored or measured, etc. For example, detectors and/or sensors are used to sense the on/off state of power circuits, proximity switches, pushbutton switches, thermostats, relays or even the presence of positive or negative digital logic-level signals. The instrumentation system typically also includes interface hardware for receiving the measured field signals and providing them to a computer system, such as a personal computer system. The computer system typically performs data analysis and presentation for appropriately analyzing and displaying the measured data.

Signal conditioning modules are typically provided for conditioning the acquired analog signals by amplifying, isolating, filtering or otherwise converting the signals to the appropriate signals for the computer system. As one example, the signals are then provided to a plug-in data acquisition (DAQ) input/output (I/O) board, or a computer system-based instrument which is plugged into one of the I/O slots of a computer system or otherwise connected to the computer system. Generally, the computer system has an I/O bus and connectors or slots for receiving I/O boards. Various computer systems and I/O buses may be used to implement a computer system for receiving the measurements. The computer system may receive measurements from multiple sources, where, for example, different sources may interface with the computer system through respective input modules.

A computer system may be actively involved in receiving data from an input module (such as a data acquisition device). The input module may include a memory such as a First In, First Out (FIFO) memory. Data transfer from the FIFO memory to a host memory may affect the performance of the computer system because the computer system may poll the status of the FIFO memory before each data transfer. In addition, where multiple channels of data are being sampled (e.g., during single point transfer), a status of each channel may need to be polled before transferring data associated with the channel. If a large number of channels are used, performance of the computer system may become especially slow.

In order to free up the host computer system CPU from low level data acquisition tasks, a DMA (Direct Memory Access) controller is typically included in a data acquisition device. The DMA controller may control transfers of data from the FIFO memory to the host computer memory. However, even with a DMA controller, the computer system may still have to poll a status of each channel before transferring data.

SUMMARY OF THE INVENTION

In various embodiments, a data acquisition system may include a host computer system coupled to a data acquisition device. The data acquisition device may receive data from an external system or unit under test (UUT) and transfer the data to the host computer system. In some embodiments, the data acquisition device may include a DMA controller and a memory, such as a FIFO memory, to receive data from a sensor coupled to the UUT.

In various embodiments, a pattern may be written to an allocated section of host memory on the host computer system. The pattern may be used to track how much data has been received by the host memory from the DMA controller. In some embodiments, the allocated section of host memory may be partitioned into multiple aggregates, such as samples, each of which may be further partitioned into multiple atomic units such as conversions. In some embodiments, the pattern may be written to the first and/or last conversion of each sample in the allocated section of memory. The pattern may include a pattern that is not expected to be written to the memory. For example, it may be known that a pattern of alternating 1's and 0's will not be written to the memory by the DMA controller.

In some embodiments, a driver may read the host memory when an application on the host computer system requests sampled data. For example, the application may request a current time sample of sensor data from a UUT. In some embodiments, the driver may send the most recently written sample of data from the host memory to the application (e.g., to a random access memory (RAM) being accessed by the application). In some embodiments, the driver may determine the amount of data written to the host memory by reading the allocated section of host memory and determining the size of a portion of the host memory that previously had the pattern that has currently been written over with data. The driver may determine if more data than a predetermined amount of data has been written to the host memory or is available to be written to the host memory. For example, if more samples in the host memory have had data written into them than expected, or if data on a data acquisition device is waiting to be transferred to the host memory as the driver is sending other data from the host memory to the application, the driver may determine that data is becoming available faster than the application is accessing it. If more data has been written than expected, an indication may be returned to the application that it is not keeping up with the incoming data.

BRIEF DESCRIPTION OF THE DRAWINGS

The foregoing, as well as other objects, features, and advantages of this invention may be more completely understood by reference to the following detailed description when read together with the accompanying drawings in which.

Figure 1A:
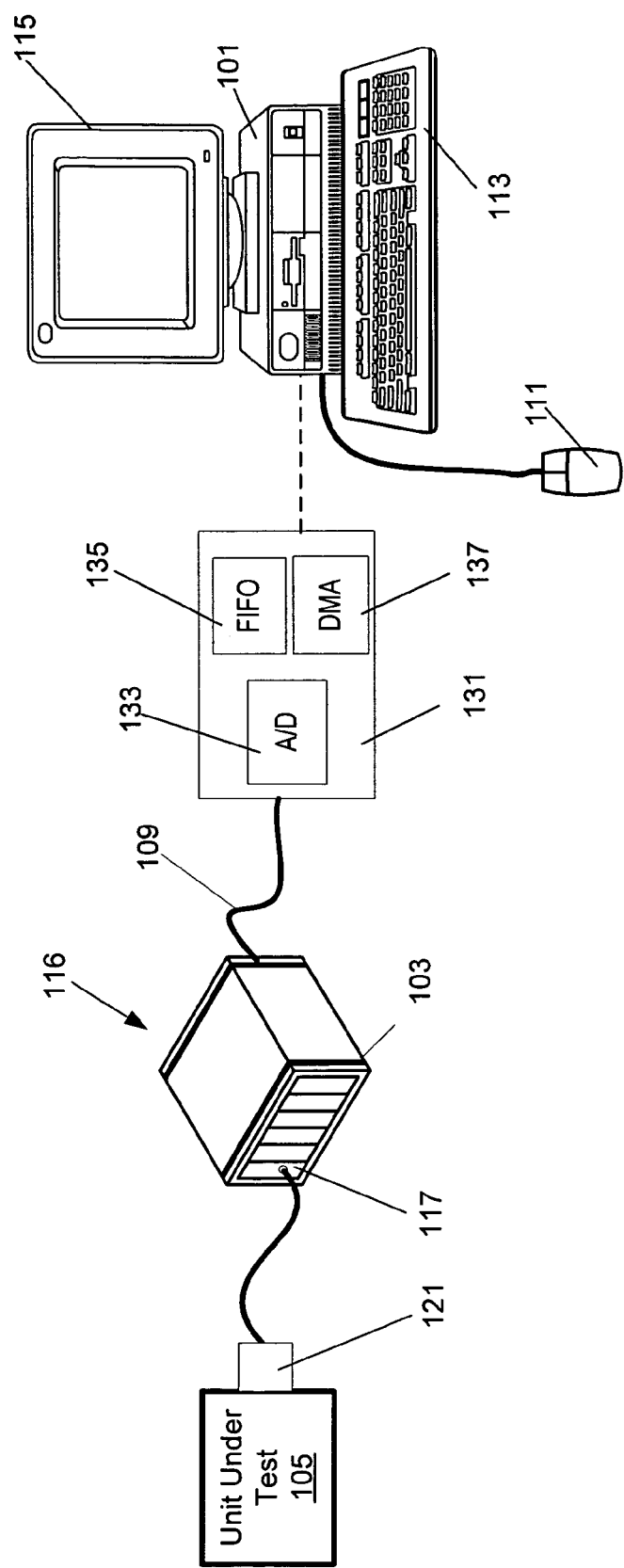
FIGS. 1a, 1b, and 1c illustrate systems for data acquisition for a unit under test, according to several embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Figure 1B:
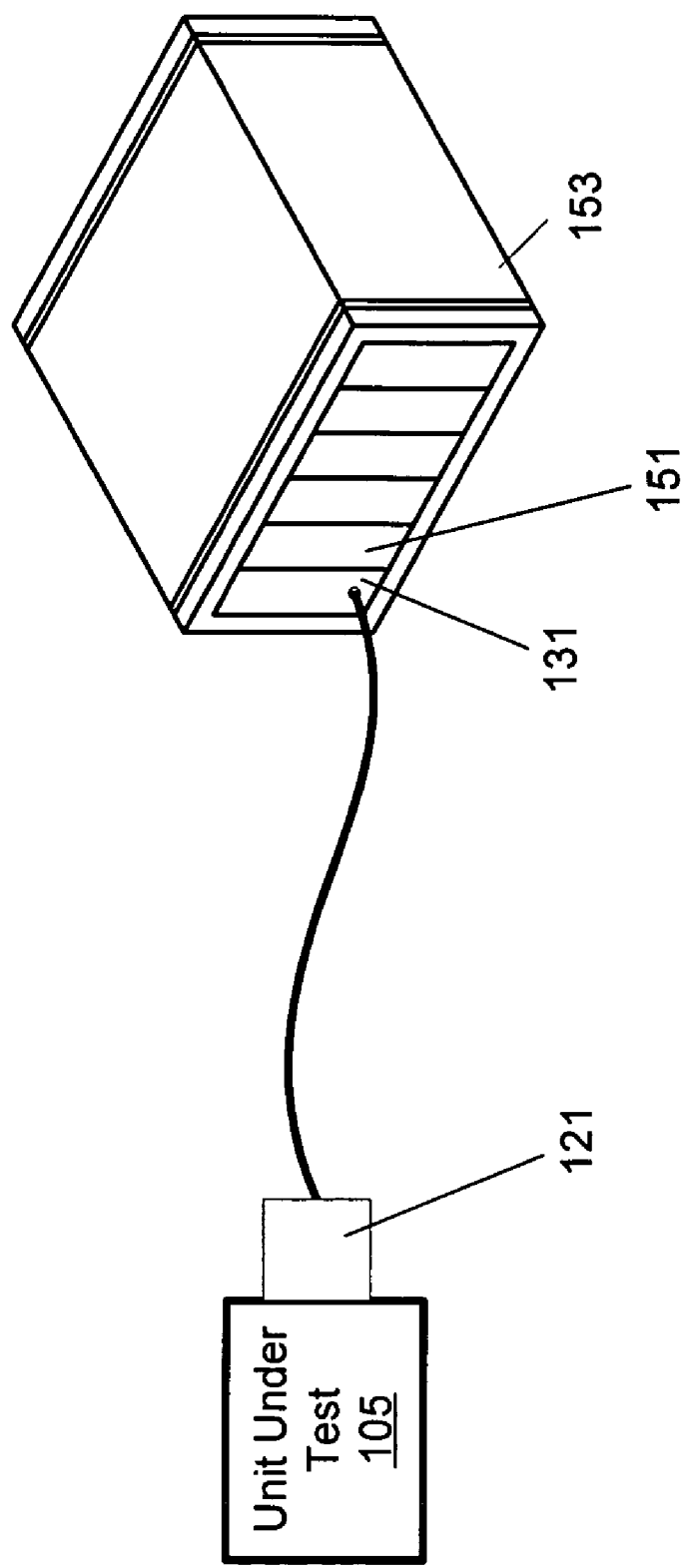
Figure 1C:
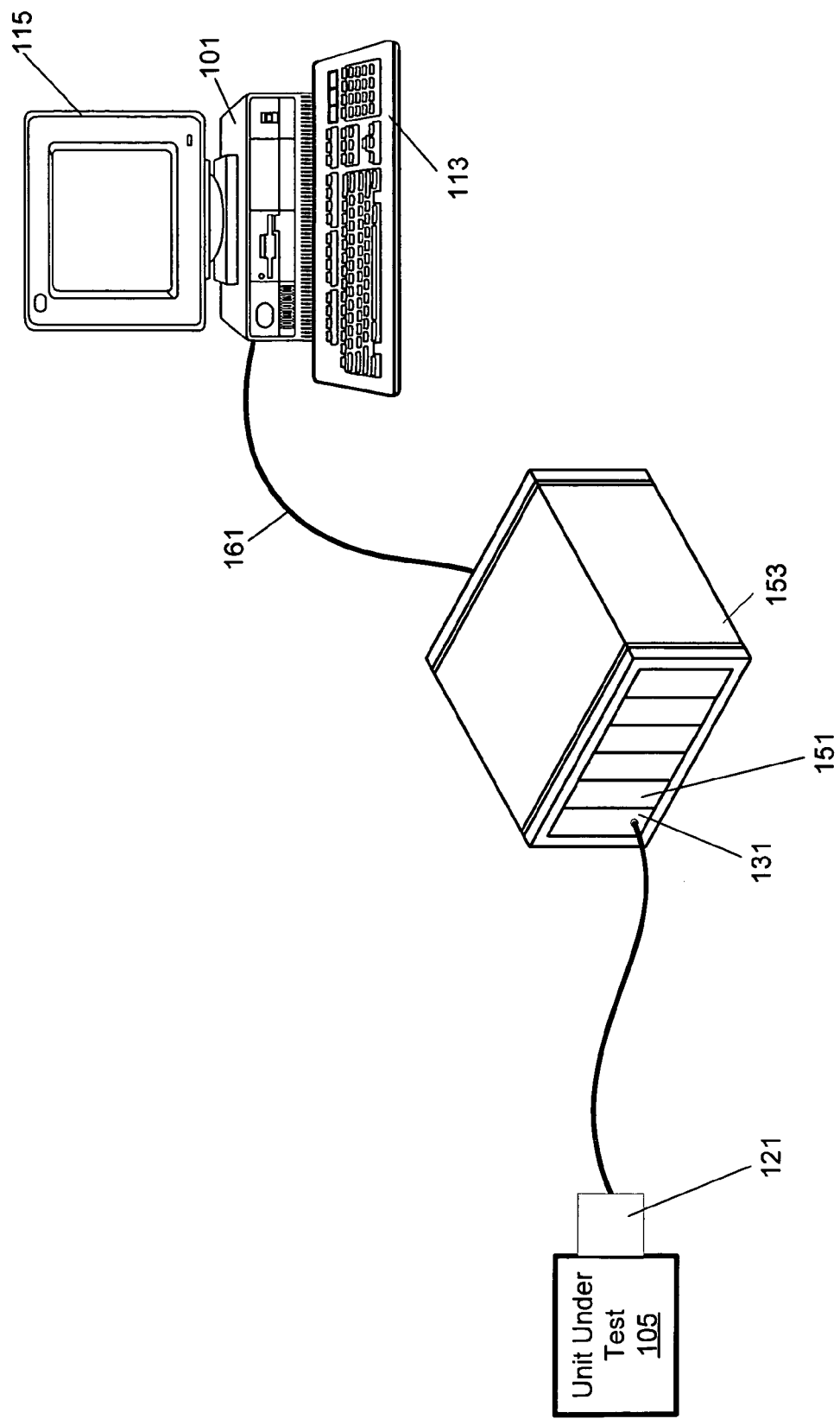

FIGS. 1a, 1b, and 1c illustrate various embodiments of data acquisition systems for acquiring data from a unit under test (UUT) 105 or physical system. It is noted that embodiments of the present invention may be used in any of various types of systems, and the data acquisition systems in FIGS. 1a, 1b, and 1c are exemplary only.

In various embodiments, the UUT 105 may be any of various types of apparatus, circuits, physical system or physical phenomenon. In some embodiments, the UUT 105 may include mechanical or electrical machinery or any other device with attributes that may be measured using a sensor 121.

As shown, the data acquisition system may comprise a sensor 121 for acquiring data from the UUT 105. The sensor 121 may be any of various types of sensors or transducers, such as a thermocouple, thermistor, strain gauge, microphone, etc.

The sensor 121 may provide analog signals to a signal conditioning unit 116. The signal conditioning unit 116 may include a chassis 103 with one or more signal conditioning modules 117. In some embodiments, signals from the sensor 121 may be conditioned and/or modified by the one or more signal conditioning modules 117 prior to being transmitted to the measurement device or data acquisition device 131. In other embodiments, the signals from the sensor 121 may be sent directly to the measurement device 131, without any signal conditioning.

The measurement device or data acquisition device 131 may receive the analog signals from the sensor 121 or signal conditioning unit 116. In some embodiments, analog signals may be sent over cable 109 to the data acquisition device 131. In one embodiment, the data acquisition device 131 is a data acquisition board comprised in a slot of computer system 101. In FIG. 1a, the data acquisition device 131 is shown outside of the computer system 101 for illustrative purposes, but may be comprised in the computer system 101. In another embodiment, the data acquisition device 131 may be external to the computer system 101. For example, the data acquisition device 131 may be comprised in the chassis 103. The data acquisition device 131 may comprise analog to digital (A/D) converter(s) 133, memory 135, and a Direct Memory Access (DMA) controller 137. If the data acquisition device 131 is external to the computer system, digital signals may be sent from the data acquisition device 131 to the computer system 101 through a cable (e.g., a Universal Serial Bus (USB) cable, an IEEE 1394 cable, or a an IEEE 1374 cable). Other cables and connection types are also contemplated. For example, in various embodiments, the computer system 101 may couple to the data acquisition device 131 through other medium including Ethernet, wireless media such as IEEE 802.11 (Wireless Ethernet) Bluetooth, a network, such as a Control Area Network (CAN) or the Internet, serial or parallel buses, or any other transmission means.

Analog signals from the sensor 121 may be converted into digital form by an A/D converter 133 on the data acquisition device 131. Digital signals from the A/D converter 133 may be stored in the buffers or memory 135, such as First In First Out (FIFO) memory. While embodiments below may be described with a FIFO memory, it is to be understood that any type of memory may be used. In some embodiments, data from the FIFO memory 135 may be transferred to a host memory on the computer system 101 by the DMA controller 137.

As noted above, the data acquisition device 131 may be coupled to or comprised in the computer system 101. Computer system 101 may be any of various types of systems, e.g., a personal computer system, a portable computer system, etc. Other types of computer systems are also contemplated. For example, the computer system 101 may be an embedded computer system, such as a PXI (Peripheral Component Interconnect (PCI) Extensions for Instrumentation) controller 151 (seen in FIG. 1b). The computer system 101 may include a central processing unit (CPU), a display screen 115, memory (host memory and/or random access memory), and one or more input devices such as a mouse 111 or keyboard 113. As noted above, the data acquisition device 131 may operate to transfer acquired data to the host memory in the computer system 101. The computer system 101 may then operate to store, analyze and/or display the data. The computer system 101 may also be used to configure or program the sensor 121 (smart sensor), e.g., through the data acquisition device 131.

As seen in FIG. 1b, a PXI chassis 153 may include an embedded computer system (e.g., a PXI controller module 151) with a processor, host memory, etc., for processing data from the sensor 121. In some embodiments, the data acquisition device 131 may also be comprised in the PXI chassis 153. The data acquisition device 131 may be coupled to the PXI controller module 151 (e.g., through a backplane of the PXI chassis 153). In various embodiments, the A/D converter, FIFO memory, and DMA controller may be included on the data acquisition device 131 or the PXI controller module 151. In various embodiments, the DMA controller may transfer data from the FIFO memory to the host memory on the PXI controller 151 for access by an application on the PXI controller 151. In some embodiments, a monitor and/or other peripheral devices may be coupled to the PXI chassis 153.

FIG. 1c illustrates a PXI chassis 153 coupled to a computer system 101. In some embodiments, a PXI chassis 153 may be coupled to the computer system 101 through a MXI (Multisystem Extension Interface) Interface To Everything (MITE)) 161. In some embodiments, the MXI 161 may split the PCI bridge of the computer system 101 into two halves (one half in the PXI chassis 153) which are connected by a serial link. In some embodiments, the DMA controller on the data acquisition device 131 may transfer data from the FIFO memory to a host memory on the PXI controller 151 in the PXI chassis 153. For example, an application on the PXI controller 151 may use the data to monitor the UUT 105. In some embodiments, the DMA controller may transfer data from the FIFO memory to the host memory on the computer system 101 through the MXI 161. For example, an application to monitor the UUT 105 may reside on the computer system 101 instead of or in addition to an application on the PXI controller 151.

Figure 2:
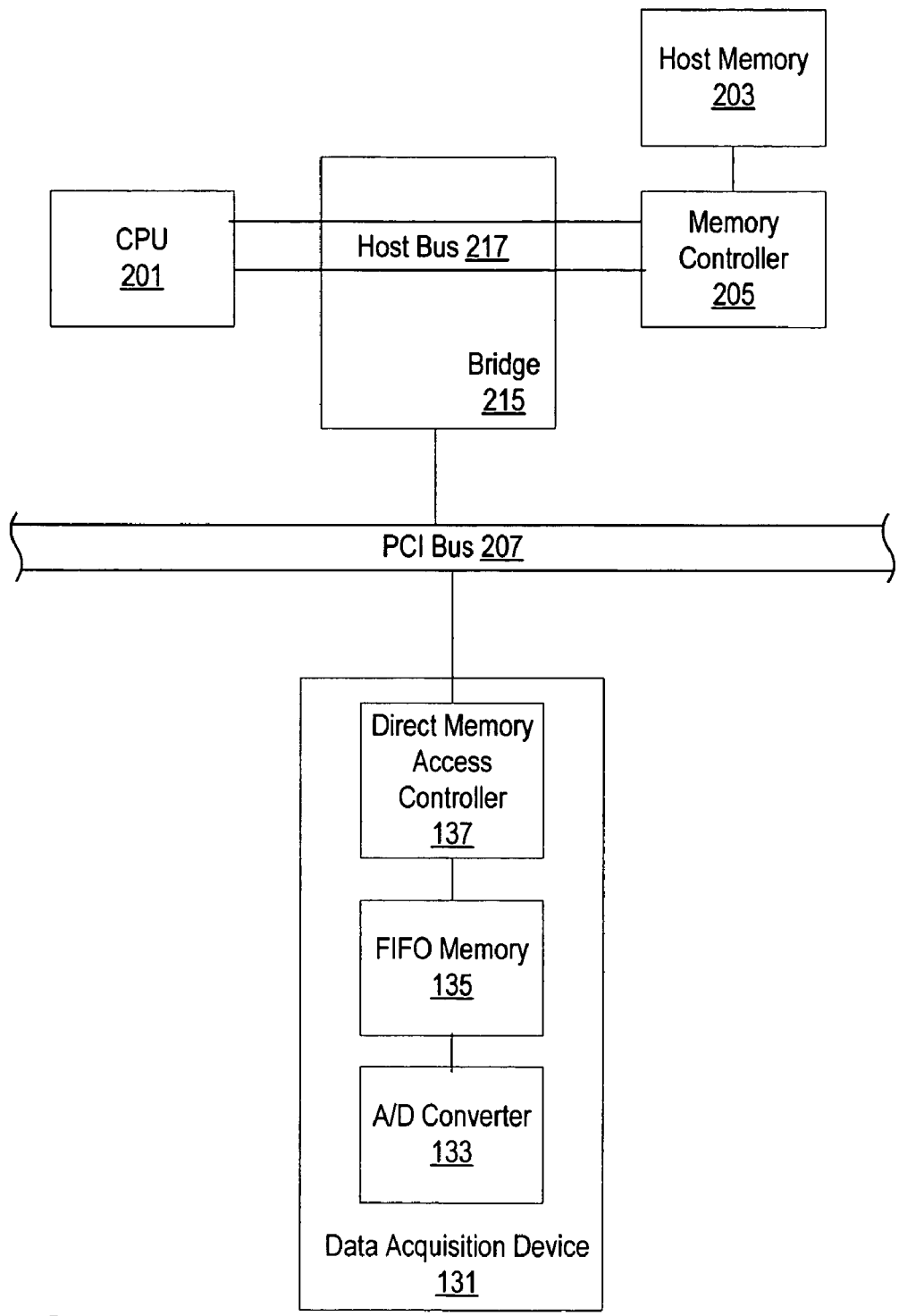
FIG. 2 illustrates a diagram of a system for data acquisition using direct memory access, according to an embodiment.

FIG. 2 illustrates a diagram of an embodiment of a system for data acquisition using direct memory access. Signals from a sensor 121 may be received by a data acquisition device 131 and stored on a FIFO memory 135 after being converted into a digital form by the A/D converter 133. In some embodiments, the host memory 203 may be coupled to the FIFO memory 135 through the DMA controller 137. The DMA controller 137 may be coupled to the host memory 203 through the PCI bus 207 and bridge 215. In some embodiments, the DMA controller 137 may have exclusive access to the PCI bus 207 for a period of time to transfer data from the FIFO memory 135 to the host memory 203. Other connections may also be used. For example, the DMA controller 137 may have a separate communication path to the host memory 203. In some embodiments, the DMA controller 137 may also access the host memory 203 through any bus that provides direct memory access.

In some embodiments, the DMA controller 137 may handle data transfer from the FIFO memory 135 to the host memory 203 with minimal interrupts to a CPU 201. As seen in FIG. 2, the CPU 201 may be coupled to the host memory 203 through a host bus 217 and memory controller 205. In various embodiments, once the DMA controller 137 transfers data to the host memory 203, an application on the CPU 201 may access the data. For example, an application may access the data to analyze performance of the UUT 105.

In some embodiments, a pattern may be written to the host memory 203 prior to receiving data from the DMA controller 137 to determine how much data has been written into the host memory 203. For example, the pattern may be a pattern that is not expected to be written to the memory (such as an alternating series of 1's and 0's). The pattern may include a pattern that is not expected to be and/or known not to be written to the memory by the DMA controller 137. In some embodiments, after data is written over a portion of the host memory 203 by the DMA controller 137, a driver (e.g., a software driver executing on the CPU 201) may determine how much of the host memory 203 has been written over by searching for the first available portion of the host memory 203 that still has the pattern (i.e., that has not been written over with data). The driver may thus determine if sampled data is being processed in real time (e.g., as it is received), or whether the computer system is not processing the data as it becomes available.

Figure 3:
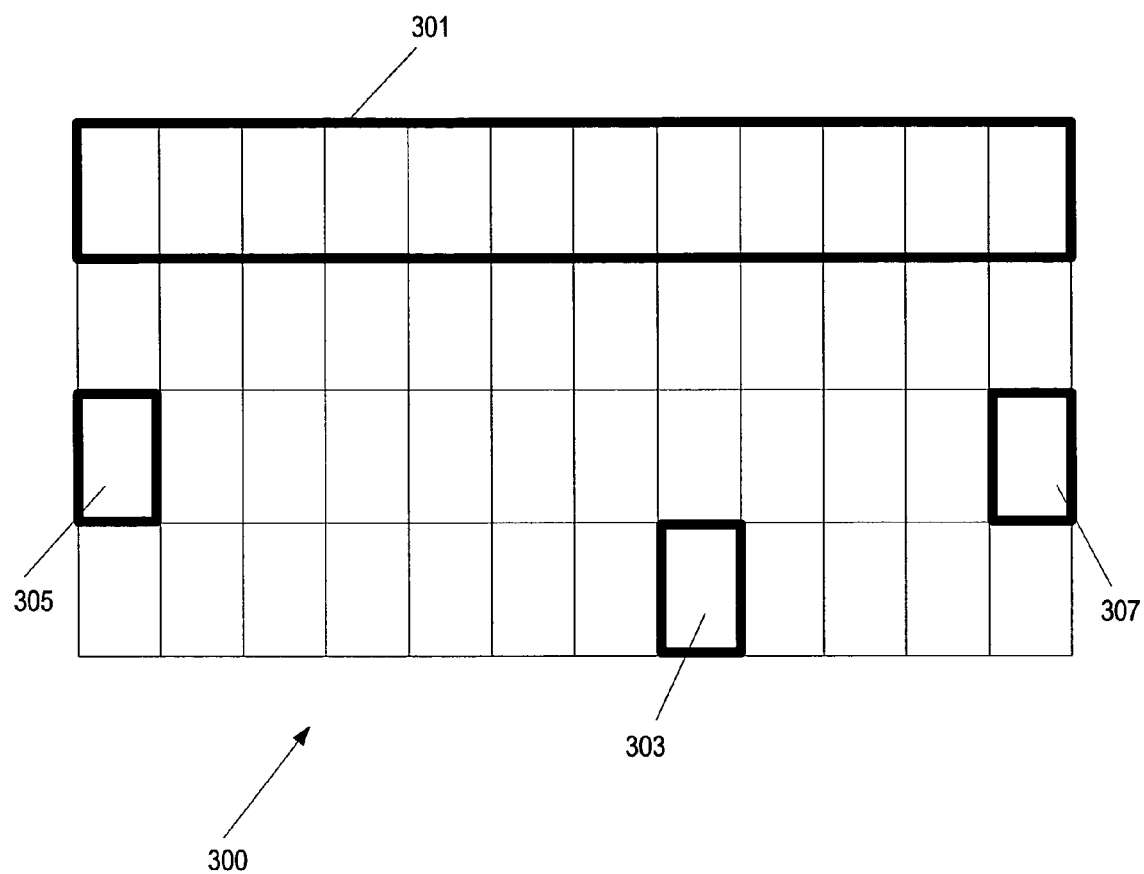
FIG. 3 illustrates a partitioned section of host memory, according to an embodiment.

FIG. 3 illustrates an embodiment of a partitioned section 300 of host memory. In some embodiments, a section 300 of host memory may be partitioned into one or more "samples" 301 (i.e., first, second, etc. partitions) and one or more "conversions" (e.g., conversion 303). For example, each sample 301 may be partitioned into multiple conversions 303. Other aggregates of memory and atomic units of those aggregates may also be used. In some embodiments, each conversion 303 may have multiple "data bits" and multiple "sign bits". In some embodiments, the number of data bits plus the number of sign bits for each conversion 303 may be 16 or 32. Other sums for data bits and sign bits may also be used. The number of sign bits may be greater than or equal to 2 and may be all zeros to indicate a positive number or all 1's to indicate a negative number.

In some embodiments, a pattern may be written to the first conversion (e.g., conversion 305) and/or the last conversion (e.g., conversion 307) of each sample (e.g., sample 301). The pattern may also be written to other conversions in each sample 301. In some embodiments, the pattern may be written over every conversion of each sample. In some embodiments, the pattern may be a pattern that is not expected to be written by a DMA controller. For example, the pattern may include an alternating pattern of 0's and 1's (i.e., a "sentinel" pattern). For example, if the number of data bits plus the number of sign bits in a conversion equals 16, the sentinel pattern may be 0xAAAA or 0x5555. Other patterns and configurations that are expected not to be and/or known not to be written to the host memory may also be used (e.g., other sequences of 0's and 1's may be used).

Figure 4:
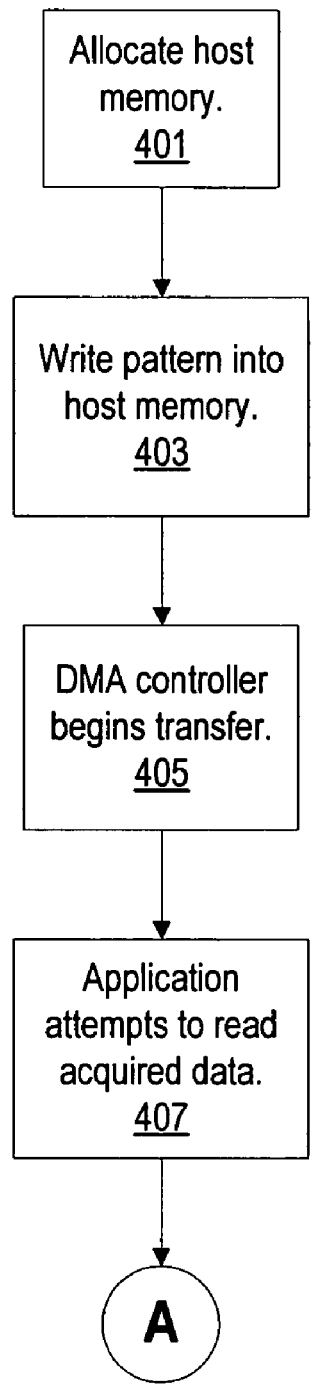
FIG. 4 illustrates a flowchart for direct memory access, according to an embodiment.
Figure 5:
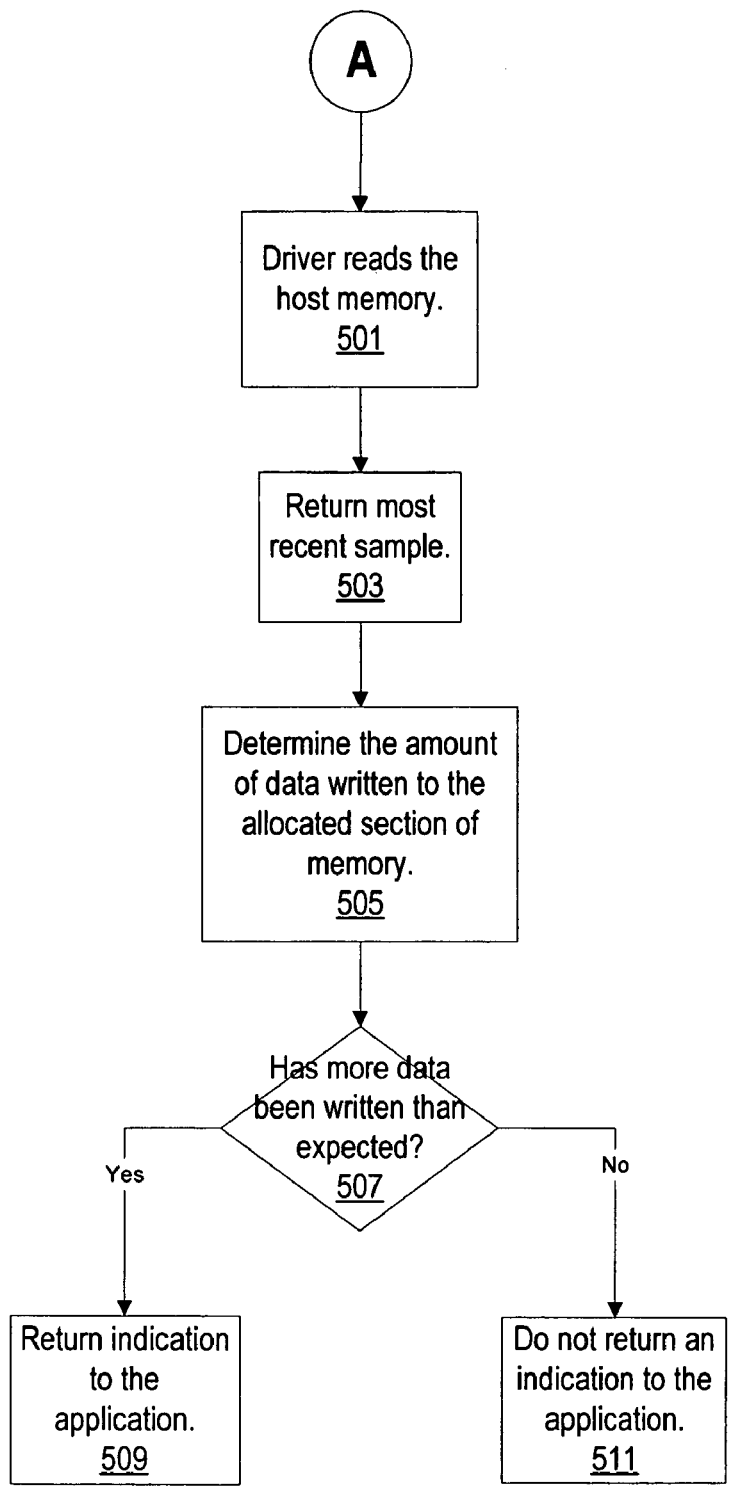
FIG. 5 illustrates a flowchart for determining if data is being received faster than expected through the DMA controller, according to an embodiment.
Figure 6:
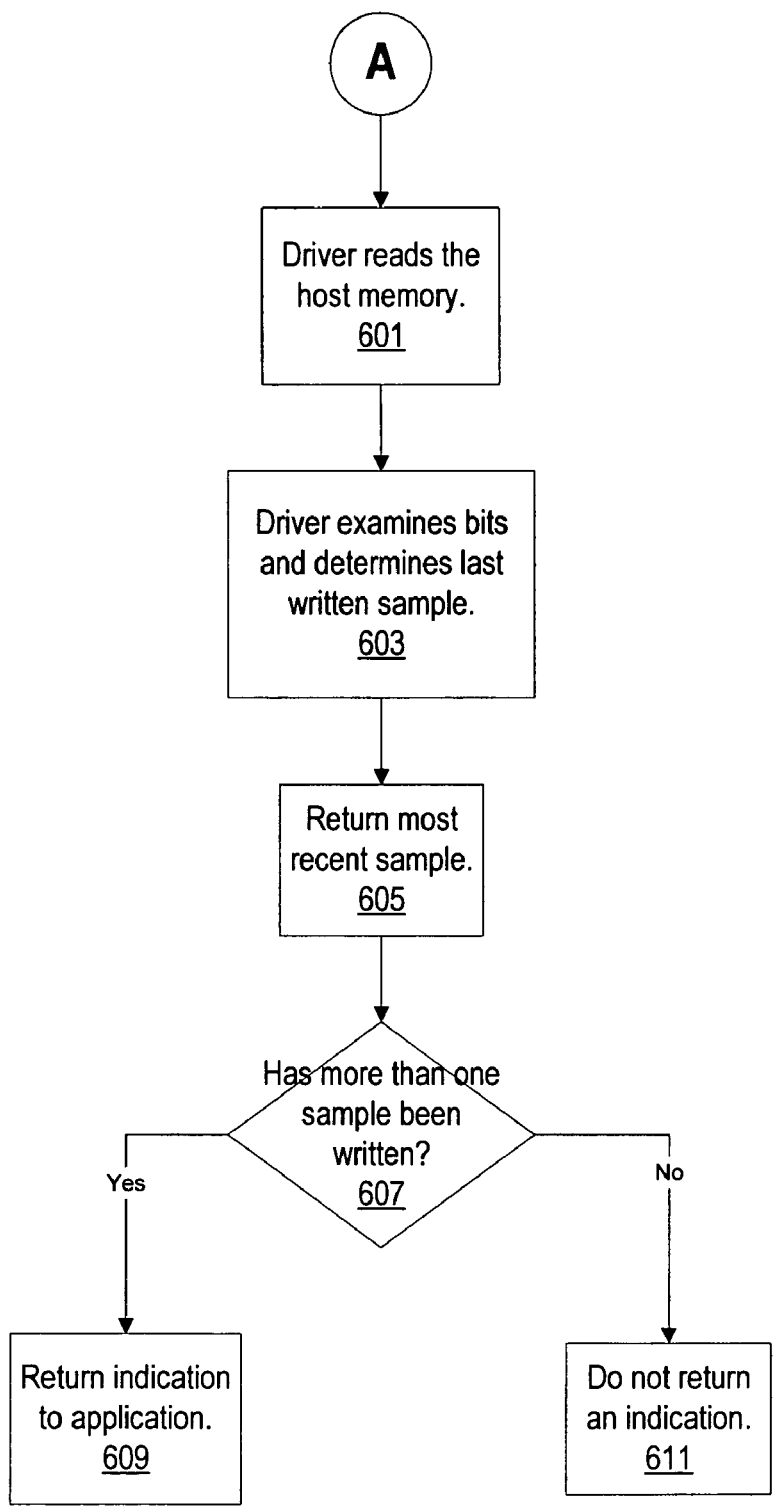
FIG. 6 illustrates a flowchart for direct memory access in single point (i.e., real time) data transfer, according to an embodiment.
Figure 7:
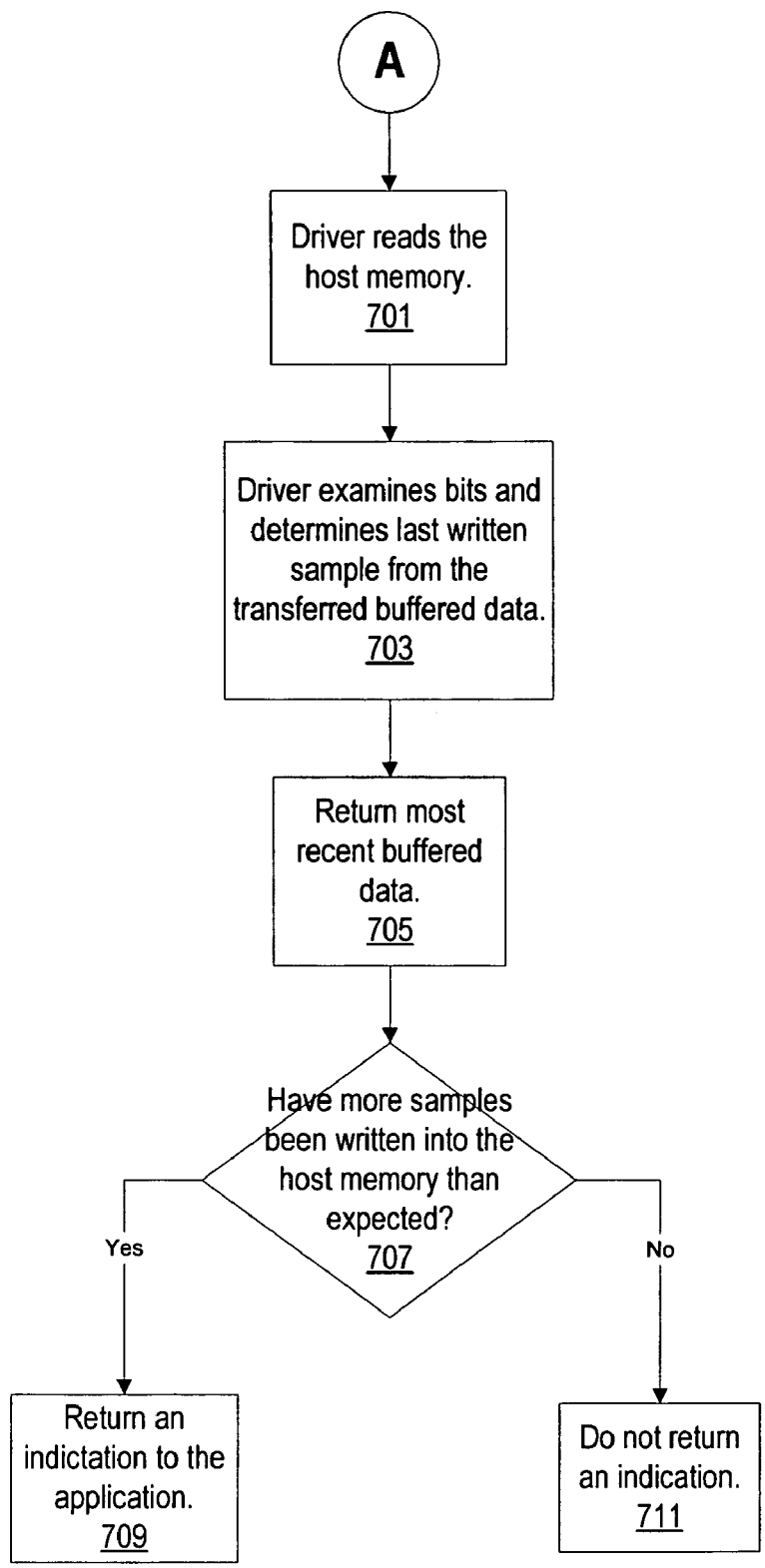
FIG. 7 illustrates a flowchart for direct memory access in buffered data transfer, according to an embodiment.

FIG. 4 illustrates a flowchart of an embodiment for direct memory access. FIGS. 5, 6, and 7 illustrate various continuing embodiments of the method illustrated in FIG. 4. It is noted that the embodiments of the methods described below are meant to be exemplary only. For example, in various embodiments, two or more of the points described may be performed concurrently or in a different order than shown, or may be omitted. Additional points may also be performed.

At 401, a section of host memory may be allocated. For example, a contiguous section of host memory 203 may be allocated for data transfer from a FIFO memory 135 using a DMA controller 137. In some embodiments, a block may not be allocated. For example, the host memory 203 may be used as it is available.

At 403, a pattern may be written into host memory 203 (e.g., in the allocated portion of host memory 203). In some embodiments, a pattern may be written to the first and/or last conversion of each sample in the allocated section of memory.

At 405, a DMA controller 137 may be initiated to begin data transfer. For example, the DMA controller 137 may transfer data from a FIFO memory 135 to the allocated section of host memory 203. The data on the FIFO memory 135 may be from a sensor coupled to a UUT 105. In some embodiments, the DMA controller 137 may wrap around to the beginning of the section of allocated host memory 203 after it transfers data into the last location of the allocated section of host memory 203. In some embodiments, the data transfer through the DMA controller 137 may not require multiple interrupts to the CPU 201.

At 407, an application may request to read data. For example, an application running on the CPU 201 may request a current time sample of sensor data from a UUT 105. In some embodiments, time samples may be stored on a different location on the host memory for later access by an application.

FIG. 5 illustrates a flowchart of an embodiment for determining if data is being received by the host memory faster than expected through the DMA controller. In some embodiments, the flowchart in FIG. 5 may continue from the FIG. 4 flowchart.

At 501, a driver may read the host memory (e.g., after receiving a request from the application to read data). In some embodiments, the driver may be a set of program instructions executable to control data access on the host memory.

At 503, the driver may send the most recently written sample of data from the host memory to the application. For example, the most recently written sample may be sent to a RAM memory accessible by the application. In some embodiments, the most recently written sample may be sent to another location on the host memory for later access by the application.

At 505, the driver may determine the amount of data written to the host memory by reading the allocated section of host memory and determining the size of a portion of memory with the pattern that has been written over with data. For example, the driver may start at the beginning of the allocated section and read until the pattern is encountered.

At 507, the driver may determine if more data than a predetermined amount of data has been written to the host memory or is available to be written to the host memory. For example, if more samples in the host memory have been written over than expected, or if data on a data acquisition device is waiting to be transferred to the host memory, as the driver is sending other data from the host memory to the application, the driver may determine that data is becoming available faster than the application is accessing it. For example, the application may be attempting to analyze the data in real time (e.g., as it is collected) or within a set amount of time after it has been collected (e.g., in a buffered or delayed transfer).

At 509, if more data has been written than expected, an indication (e.g., a warning or an error) may be returned to the application that it is not keeping up with the incoming data. Other indications are also contemplated. For example, an exception or interrupt may be sent to the application. In some embodiments, the application may need this indication that it is not keeping up with the incoming data. For example, if an application is monitoring a UUT for a critical condition (e.g., excessive heat build up) in order to shut down the UUT if the critical condition is detected, not analyzing the data as it is collected may result in not detecting the critical condition in time to prevent damage.

At 511, if data is being written to the host memory at an expected pace, an indication may not be returned. In some embodiments, a confirmation that the application is keeping up with the incoming data may be sent.

FIG. 6 illustrates a flowchart of an embodiment for direct memory access in single point (i.e., real time) data transfer. In some embodiments, the flowchart in FIG. 6 may continue from the FIG. 4 flowchart.

At 601, the driver may read the host memory. For example, an application may request sampled data transferred from a data acquisition device (e.g., from a FIFO memory on the data acquisition device).

At 603, the driver may examine bits of a first conversion for each sample to determine the last written sample. For example, the first conversion of each sample may be examined in order until the pattern is encountered.

At 605, the driver may return the most recently written sample from the host memory. For example, the sample just previous to the first sample encountered with the pattern may be sent. In some embodiments, after the sample is sent, the pattern may be written back over the portion of the allocated memory without the pattern (i.e., which was written over with data).

At 607, a determination may be made whether more than one sample has been written (e.g., by determining if more than one sample with a previously written pattern has been written over with data). In some embodiments, the application may expect to access each sample written to the host memory before a subsequent sample is written to the host memory. If the driver encounters multiple written samples that have not been returned to the application, the driver may determine that the application is not accessing the samples in real time. In addition, if data is waiting to be written from the DMA controller as the most recently written sample is being sent by the driver, the driver may determine that the application is not accessing the samples in real time. In some embodiments, a status register of the FIFO memory may be read to determine if additional data is waiting to be transferred from the DMA controller. Other methods of determining if additional data is waiting are also contemplated.

At 609, if more than one sample has been written, an indication may be returned to the application. In some embodiments, an application may attempt to process data in real time. If the application is not accessing the data as it is coming in, the real time application may need to make adjustments (e.g., take fewer samples per unit of time and/or use fewer steps to analyze incoming data).

At 611, if more than one sample has not been written since the last data access, an indication may not be returned to the application.

FIG. 7 illustrates a flowchart of an embodiment for direct memory access in buffered data transfer. In some embodiments, the flowchart in FIG. 7 may continue from the FIG. 4 flowchart.

At 701, the driver may read the host memory upon receiving a request from an application for data.

At 703, a driver may examine the samples and determine the last written sample from the transferred data. For example, the driver may determine the last sample with previously written pattern that has been written over with data. In some embodiments, data may be buffered on the FIFO memory and accessed by the application in blocks (i.e., multiple samples at a time).

At 705, the most recent buffered data may be returned from the FIFO memory. In some embodiments, data may be transferred from the FIFO memory and buffered onto the host memory until accessed by an application or until an allocated portion of the host memory is filled. In some embodiments, the DMA controller may wrap around to the beginning of the allocated portion of the host memory to continue writing data after the allocated portion is filled. In some embodiments, after a requested number of buffered samples is sent, the pattern may be rewritten onto the portion of the memory which was just previously written over with data.

At 707, the driver may determine if more samples have been written into the host memory than expected. For example, an application may pre-set an expected number of samples it expects to process between buffered transfers.

At 709, if more samples have been written than expected, an indication may be returned to the application.

At 711, if samples are being written as expected, an indication may not be returned to the application.

Figure 8:
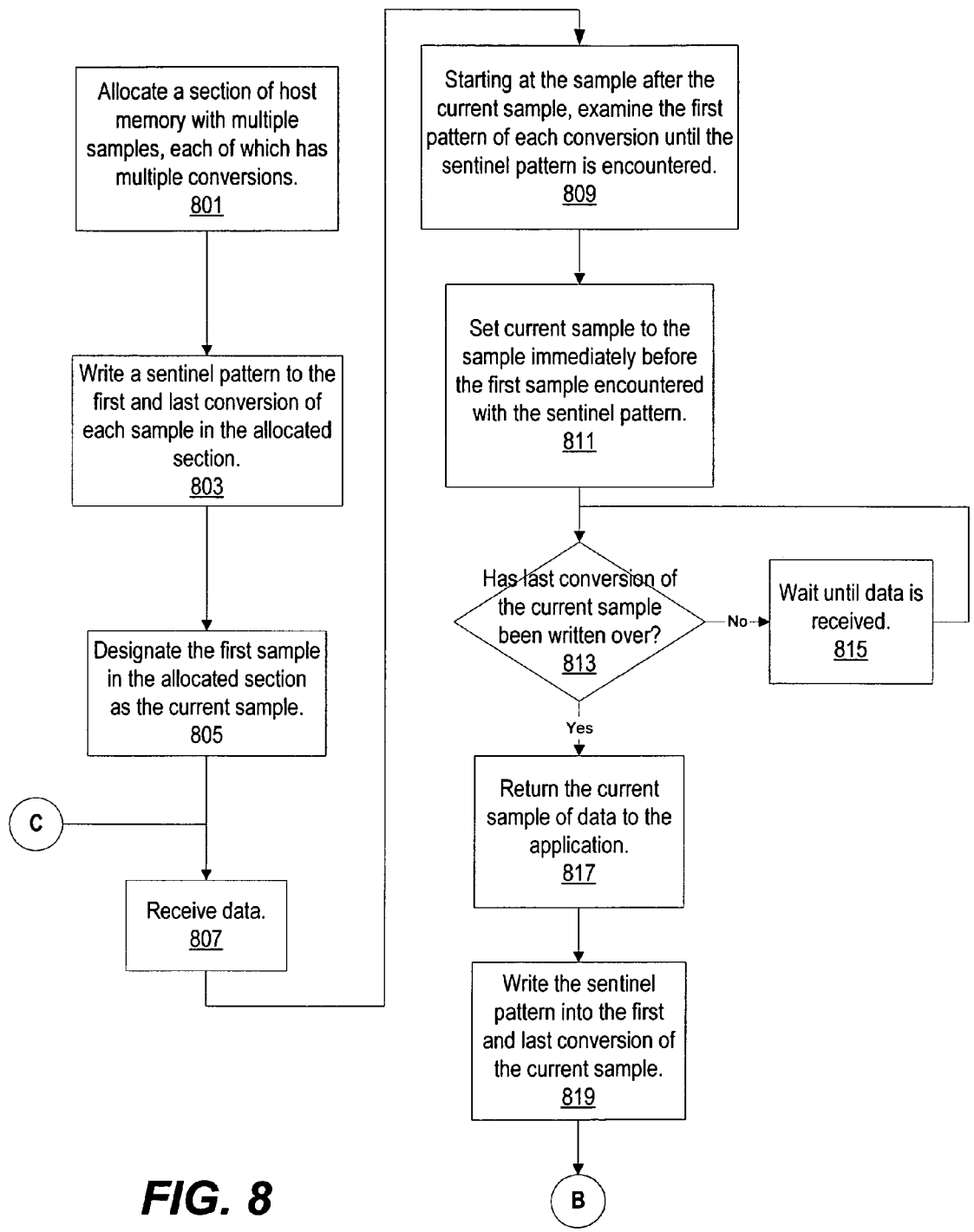
FIG. 8 illustrates a flowchart for returning a most recent sample of data to an application, according to an embodiment.

FIG. 8 illustrates a flowchart for returning a most recent sample of data to an application.

At 801, a section of host memory may be allocated. In some embodiments, the section may be partitioned into multiple samples, each of which may have multiple. conversions. The host memory may also be partitioned into other aggregates and atomic units of those aggregates.

At 803, a sentinel pattern may be written to the first and last conversion of each sample in the allocated section. For example, the sentinel pattern may include alternating 1's and 0's. Other patterns may also be used. In some embodiments, the sentinel pattern may be written to only the first conversion or to only the last conversion of each sample. In some embodiments, the pattern may be written to an intermediary conversion. In some embodiments, the pattern may be written to a subset of the samples in the allocated section.

At 805, the first sample in the allocated section may be designated as the current sample.

At 807, data may be received. For example, data may be received from a DMA controller transferring data from the FIFO memory on the data acquisition device.

At 809, starting at the sample after the current sample, the first conversion of each sample may be examined until the sentinel pattern is encountered. If the sentinel pattern is not encountered, an indication such as an overflow error may be returned. Other indications are also contemplated. In some embodiments, a conversion other than the first conversion may be examined to determine if an overflow error has occurred.

At 811, the sample immediately before the first sample encountered with the sentinel pattern may be set to the current sample.

At 813, a driver may determine if a last conversion of the current sample has been written over. In some embodiments, the driver may examine a different conversion.

At 815, if a last conversion of the current sample has not been written over, a driver may wait until data is received.

At 817, if the last conversion of the current sample has been written over, the current sample of data may be returned to the application.

At 819, after the data is returned to the application, the sentinel pattern may be written into the first and last conversion of the current sample.

Figure 9:
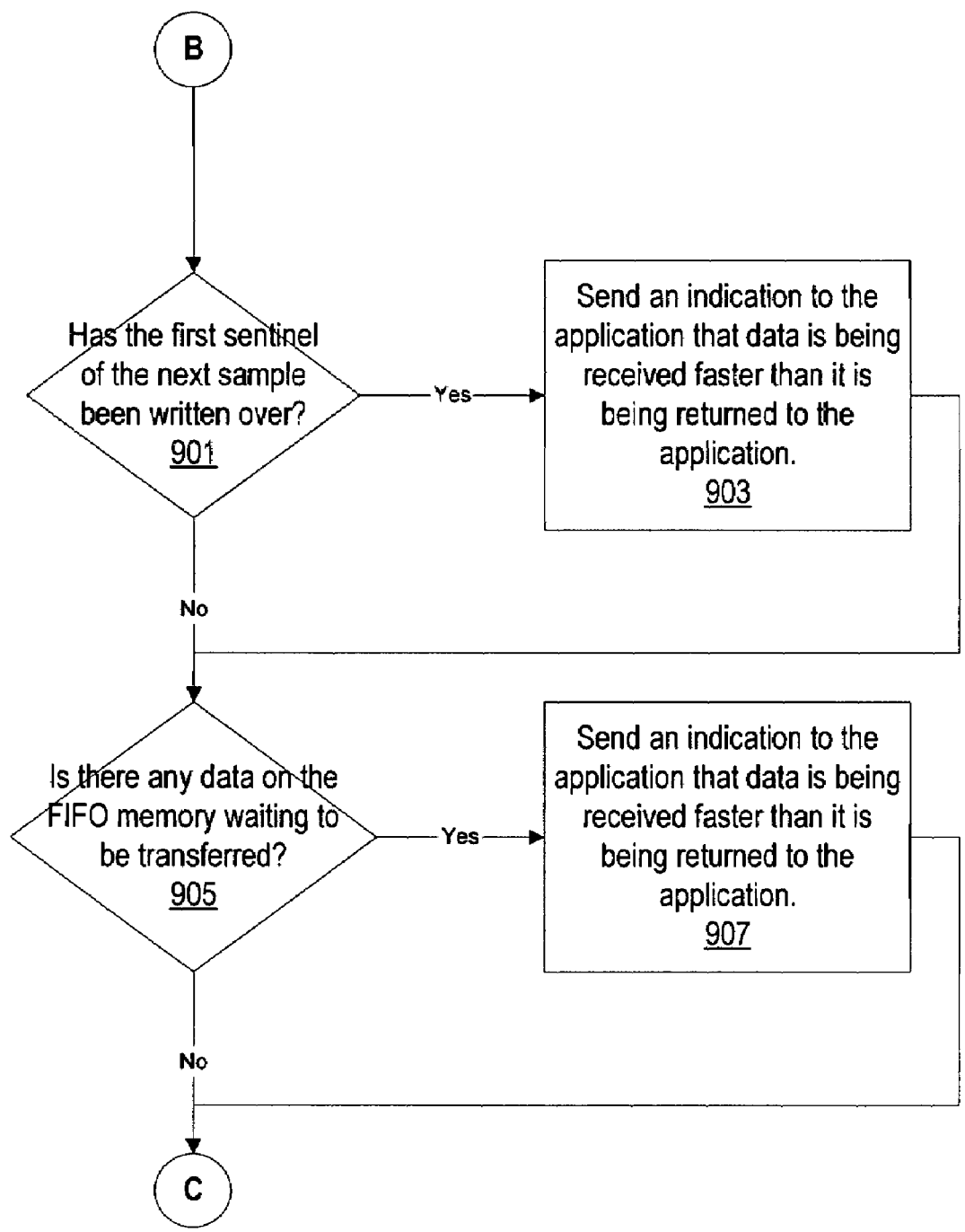
FIG. 9 illustrates a flowchart for determining if an application is keeping real time, according to an embodiment.

FIG. 9 illustrates a flowchart of an embodiment for determining if an application is keeping real time. In some embodiments, the flowchart in FIG. 9 may continue from the FIG. 8 flowchart.

At 901, a driver may determine if the first conversion of the next sample after the current sample has been written over.

At 903, if the first conversion of the next sample has been written over, an indication may be sent to the application that data is being received faster than it is being returned to the application.

At 905, a driver may determine if there is any data on the FIFO memory waiting to be transferred.

At 907, if there is data on the FIFO memory waiting to be transferred, an indication may be sent to the application that data is being received faster than it is being returned to the application.

The flow may then return to 807 in FIG. 8.

In some embodiments, executable instructions may be stored on a memory medium. A memory medium may be any of various types of memory devices or storage devices. The term "memory medium" is intended to include an installation medium, e.g., a CD-ROM, floppy disks, or tape device; a computer memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. A carrier medium may include a memory medium as described above, as well as signals such as electrical, electromagnetic, or digital signals, conveyed via a communication medium such as a bus, network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

I claim:

1. A method, comprising:
   writing a pattern into an allocated section of memory;
   receiving data into the allocated section of memory from a controller; and
   determining an amount of data written to the allocated section of memory by reading the allocated section of memory and determining a size of a portion of the allocated section of the memory where the pattern has been written over with data.

2. The method of claim 1, further comprising:
   determining if data is available to be written to the allocated section of memory faster than expected; and
   if data is available to be written to the allocated section of memory faster than expected, returning an indication.

3. The method of claim 2, wherein the indication includes at least one of an error, a warning, an exception, and an interrupt.

4. The method of claim 2, wherein determining if data is available to be written to the allocated section of memory faster than expected includes determining if more data is written to the allocated section than expected or if additional data is available from the controller before data in the allocated section of memory is returned to a requesting application.

5. The method of claim 1, wherein the pattern includes a pattern that is not expected to be written to the memory.

6. The method of claim 1, wherein the pattern comprises alternating ones and zeros.

7. The method of claim 1, wherein the allocated section of memory is partitioned into samples and each sample of the allocated section of memory is partitioned into conversions.

8. The method of claim 7, wherein the pattern is written over at least one conversion of each sample.

9. The method of claim 7, wherein the pattern is written over the first conversion and the last conversion of each sample.

10. The method of claim 7, wherein determining the size of the allocated portion of memory with the written pattern that has been written over with data includes counting a number of samples in which the first conversion no longer has the pattern.

11. The method of claim 1, further comprising rewriting the pattern over the portion of the allocated section of memory that has been written over with data.

12. The method of claim 1, further comprising providing the data written to the allocated section of memory to a requesting application.

13. The method of claim 1, further comprising reading a subsequent portion of the allocated section of memory after reading the portion of the allocated section of memory with data, wherein if the subsequent portion of the allocated section of memory does not have the pattern, returning an indication.

14. A system, comprising:
a processor;
a memory coupled to the processor, wherein a section of the memory is allocated to receive data;
a controller coupled to the memory;
wherein program instructions stored on the memory are executable to:
write a pattern into the allocated section of memory;
receive data into the allocated section of memory from the controller; and
determine an amount of data written to the allocated section of memory by reading the allocated section of memory and determining a size of a portion of the allocated section of the memory where the pattern has been written over with data.

15. The system of claim 14, wherein the program instructions are further executable to:
determine if data is available to be written to the allocated section of memory faster than expected; and
if data is available to be written to the allocated section of memory faster than expected, returning an indication.

16. The system of claim 15, wherein the indication includes at least one of an error, a warning, an exception, and an interrupt.

17. The system of claim 15, wherein determining if data is available to be written to the allocated section of memory faster than expected includes determining if more data is written to the allocated section than expected or if additional data is available from the controller before data in the allocated section of memory is returned to a requesting application.

18. The system of claim 14, wherein the pattern includes a pattern that is not expected to be written to the memory.

19. The system of claim 14, wherein the pattern comprises alternating ones and zeros.

20. The system of claim 14, wherein the allocated section of memory is partitioned into samples and each sample of the allocated section of memory is partitioned into conversions.

21. The system of claim 20, wherein the pattern is written over at least one conversion of each sample.

22. The system of claim 20, wherein the pattern is written over the first conversion and the last conversion of each sample.

23. The system of claim 20, wherein determining the size of the allocated portion of memory with the written pattern that has been written over with data includes counting a number of samples in which the first conversion no longer has the pattern.

24. The system of claim 14, wherein the program instructions are further executable to rewrite the pattern over the portion of the allocated section of memory that has been written over with data.

25. The system of claim 14, wherein the program instructions are further executable to provide the data written to the allocated section of memory to a requesting application.

26. The system of claim 14, wherein the program instructions are further executable to:
read a subsequent portion of the allocated section of memory after reading the portion of the allocated section of memory with data, wherein if the subsequent portion of the allocated section of memory does not have the pattern, returning an indication.

27. A tangible computer readable medium comprising program instructions, wherein the program instructions are executable by a processor to:
write a pattern into the allocated section of memory;
receive data into the allocated section of memory from the controller; and
determine an amount of data written to the allocated section of memory by reading the allocated section of memory and determining a size of a portion of the allocated section of the memory where the pattern has been written over with data.

28. The tangible computer readable medium of claim 27, wherein the program instructions are further executable to:
determine if data is available to be written to the allocated section of memory faster than expected; and
if data is available to be written to the allocated section of memory faster than expected, returning an indication.

29. The tangible computer readable medium of claim 28, wherein the indication includes at least one of an error, a warning, an exception, and an interrupt.

30. The tangible computer readable medium of claim 28, wherein determining if data is available to be written to the allocated section of memory faster than expected includes determining if more data is written to the allocated section than expected or if additional data is available from the controller before data in the allocated section of memory is returned to a requesting application.

31. The tangible computer readable medium of claim 27, wherein the pattern includes a pattern that is not expected to be written to the memory.

32. The tangible computer readable medium of claim 27, wherein the pattern comprises alternating ones and zeros.

33. The tangible computer readable medium of claim 27, wherein the allocated section of memory is partitioned into samples and each sample of the allocated section of memory is partitioned into conversions.

34. The tangible computer readable medium of claim 33, wherein the pattern is written over at least one conversion of each sample.

35. The tangible computer readable medium of claim 33, wherein the pattern is written over the first conversion and the last conversion of each sample.

36. The tangible computer readable medium of claim 33, wherein determining the size of the allocated section of memory with the written pattern that has been written over with data includes counting a number of samples in which the first conversion no longer has the pattern.

37. The tangible computer readable medium of claim 27, wherein the program instructions are further executable to rewrite the pattern over the allocated section of memory that has been written over with data.

38. The tangible computer readable medium of claim 27, wherein the program instructions are further executable to provide the data written to the allocated section of memory to a requesting application.

39. The tangible computer readable medium of claim 27, wherein the program instructions are further executable to:
read a subsequent partition of the allocated section of memory after reading the partition of the allocated section of memory with data, wherein if the subsequent partition of the allocated section of memory does not have the pattern, returning an indication.

40. A method, comprising:
allocating a portion of host memory;
writing a pattern into the allocated section of the host memory;
receiving data into the allocated section of the host memory from a Direct Memory Access (DMA) controller;
examining the allocated section of the host memory to determine an amount of the pattern that has been written over;
determining if data is becoming available from the DMA controller before written data is read from the allocated section of the host memory; and
if data is becoming available from the DMA controller before written data is read from the allocated section of the host memory, returning an indication.

41. The method of claim 40, wherein the allocated section of the host memory includes a first partition and a second partition, and wherein writing the pattern into the allocated section of host memory includes writing the pattern into the first partition and the second partition.

42. The method of claim 41, wherein determining if data is available from the DMA controller before written data is read from the allocated section of the host memory includes determining if data is written to the second partition or if additional data is available from the DMA controller before data is read from the first partition.

43. The method of claim 41, wherein if additional data is available from the DMA controller before data is substantially completely read from the first partition, returning an indication.

44. The method of claim 41, further comprising rewriting the pattern into the first partition after reading data from the first partition.

45. A method, comprising:
allocating a section of memory;
partitioning at least a portion of the allocated section of memory into at least two samples, wherein each sample has at least two conversions including a first conversion and a last conversion;
initializing the first conversion and the last conversion for each of the at least two samples with a pattern;
receiving data into the allocated section of memory from a DMA controller;
monitoring the last conversion of a first sample; and
examining the first conversion of the second sample when the last conversion of the first sample is written over with data to determine if the first conversion of the second sample includes data;
wherein if the first conversion of the second sample includes data, returning an indication.

46. The method of claim 45, further comprising returning a most recently written sample to a requesting application.

47. The method of claim 46, further comprising rewriting the pattern to the first conversion and the last conversion of the most recently written sample.

48. A system, comprising:
a processor;
a host memory coupled to the processor;
a direct memory access (DMA) controller coupled to the host memory; and
a First In, First Out (FIFO) memory coupled to the DMA controller;
wherein program instructions stored on a memory are executable to:
allocate a section of the host memory to receive data from the DMA controller;
write a pattern into the allocated section of memory;
initiate the DMA controller to transfer data from the FIFO memory to the host memory;
receive data into the allocated section of host memory from the DMA controller; and
determine an amount of data written to the host memory by reading the host memory and determining a size of a portion of the host memory with a previously written pattern that has been written over with data.

49. The system of claim 48, wherein the program instructions are further executable to:
determine if data is available from the DMA controller to be written to the host memory faster than expected; and
if data is available to be written en to the host memory faster than expected, returning an indication.

50. The system of claim 48, further comprising:
a signal conditioning module coupled to the DMA controller, wherein data collected by the signal conditioning module for a unit under test is stored on the FIFO memory.

51. The system of claim 48, wherein determining if data is available to be written to the host memory faster than expected includes determining if more data is written to the host memory than expected or if additional data is available from the DMA controller before data in the host memory is returned to a requesting application.

52. The system of claim 48,
wherein the host memory is partitioned into samples and each sample of the host memory is partitioned into conversions;
wherein determining the size of the host memory with the previously written pattern that has been written over with data includes counting a number of samples in which the first conversion no longer has the pattern.

* * * * *